United States Patent Office.

CHARLES L. COOMBS, OF WASHINGTON, DISTRICT OF COLUMBIA.

Letters Patent No. 94,080, dated August 24, 1869.

IMPROVED COMPOSITION OF MATTER FOR VARIOUS USES IN THE ARTS.

The Schedule referred to in these Letters Patent and making part of the same.

*To all whom it may concern:*

Be it known that I, CHARLES L. COOMBS, of the city of Washington, in the District of Columbia, have invented a new and useful Composition of Matter for Various Uses in the Arts; and I do hereby declare that the following is a full, clear, and exact description thereof.

It is a well-known fact that gelatine, albumen, fibrine, and some similar substances, are precipitated from their solutions, and rendered insoluble by solutions of tannin. Advantage is taken of this in the manufacture of leather from hides.

Many attempts have hitherto been made to produce artificial leather, but without success, owing to the homogeneous nature of pure gelatine, which prevents the penetration of the tannin-solutions, when treated in the manner of raw hides, the only method hitherto known of practically combining the tannin with the gelatine.

My invention consists in so treating the gelatine as to form a soluble tannate of gelatine that will afterward become insoluble on being properly treated. By this means I obtain an intimate union of the tannin and gelatine, and a composition which may be rendered insoluble throughout.

It is true that tannin has been directly combined with gelatine, by mixing the solutions together, but the product has been of no practical value, being insoluble, and incapable of being worked with advantage on that account.

To enable others skilled in the art to make and use my invention, I will proceed to describe it.

I take a warm solution of gelatine, of any desired strength, and add, drop by drop, a solution of tannin, until nearly all the gelatine is precipitated in the form of a flocculent precipitate.

I then heat the mass to a temperature of 212° Fahrenheit, and stir until the precipitate is dissolved, when the composition is ready for use.

My invention may also be carried out by adding, to a warm solution of gelatine, a solution of tannin in excess, until all the gelatine is precipitated. This precipitate is washed, and sufficient gelatine is added to dissolve the precipitate by heating.

I have found it advantageous in many cases to combine albumen with the above composition.

To effect this, I allow the composition to cool until the temperature is about 120° Fahrenheit. I then add the albumen in solution in various proportions, to suit the requirements of the case.

The soluble compositions thus formed gelatinize upon becoming cold, but at a temperature above 120° Fahrenheit, the compositions are perfectly liquid, and may be applied to any material by means of a brush, or may be combined with any insoluble substances to form plastic compounds for moulding and forming various articles.

The mere application of water to the composition, after drying, transforms it into the insoluble modification, and in many cases treatment with water is all that is required.

But to attain the utmost security, I prefer, in some cases, to treat it with tannin in solution, or albumen, or any of the mineral tanning-agents. Carbolic acid and creosote may be used with advantage also.

Having thus described my invention,

What I claim, and desire to secure by Letters Patent, is—

1. The soluble compound of tannin and gelatine, herein described.
2. The compound of tannin, gelatine, and albumen, herein described.
3. The use of tannin, or the mineral tanning-agents, such as alum, the salts of iron, zinc, lead, or their equivalents, for rendering articles, when treated with my composition, insoluble, as herein described.
4. The use of carbolic acid, creosote, or their equivalents, for hardening or rendering insoluble articles treated with my compound, as herein described.

CHARLES L. COOMBS.

Witnesses:
WM. KESLEY,
J. C. WILDMAN.